Oct. 7, 1941.   C. A. KLISE   2,258,060
DEVICE FOR INSERTING LINERS IN TYPE-CASTING MOLDS
Filed Aug. 3, 1939

Inventor
Charles A. Klise
by John H. Cassidy
His Attorney

Patented Oct. 7, 1941

2,258,060

UNITED STATES PATENT OFFICE 2,258,060

DEVICE FOR INSERTING LINERS IN TYPE-CASTING MOLDS

Charles A. Klise, St. Louis, Mo.

Application August 3, 1939, Serial No. 288,117

2 Claims. (Cl. 29—84)

This invention relates to a device for positioning a liner in a mold of a type casting machine.

Type casting machines such as the Mergenthaler linotype are manufactured with molds having cavities formed by end pieces called liners with the cavity of a certain length, thirty ems or five inches being the most common length. In setting type for columns of less width it is necessary to change the length of the mold cavity. This may be done by taking out one of the regular liners and inserting a longer one. But this operation requires considerable time in unfastening and refastening the mold and in selecting a liner of desired length. Quite often a liner of the exact length required is not immediately available. For convenience the regular liners are termed permanent liners. An object of this invention is to provide a device for accurately positioning a temporary liner quickly and conveniently in the mold to avoid the inconvenience of interchanging the permanent liners to secure a mold cavity of a particular length.

Means for accomplishing this object, together with the method of inserting the temporary liner, will be understood from the following detail description taken in connection with the accompanying drawing.

Figure 2:
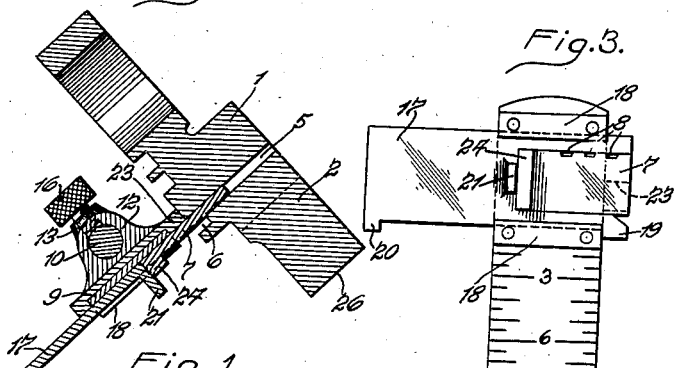
Fig. 2 is a section on line 2—2, Fig. 1.

In the drawing a conventional Mergenthaler recessed mold is shown. It may be understood that this device is adapted for use with a standard mold or a letterhead mold, as well as the recessed mold, which is shown.

A mold of the character to which this application refers is well known and understood in the art, and a detailed description is unnecessary. Such a mold includes a base 1 and a cap 2, which are spaced apart by liners 3 and 4 to form a mold cavity 5. In the embodiment as specifically shown, there is a recess or groove 6 in the cap piece 2 so that the face of the type is wider than the stem or butt of the casting. When a liner 4 of minimum length is used the mold cavity 5 is of certain definite standard length, such as thirty ems or five inches.

The liner inserting device which is the subject matter of this application is adapted to position and insert a short temporary liner 7 at an intermediate position in the mold cavity 5 to produce a shorter mold cavity of any desired length. As particularly shown, the liner 7 is three ems in length. It has a straight edge on its bottom end but has notches 8 on its upper end. Thus, when the liner is inserted in the mold, molten type metal will fill that portion of the cavity 5 between the liner 4 and the upper end of the temporary liner 7, and flow into and harden in the notches 8 to hold the liner securely in position. This leaves an effective mold cavity between the bottom of the liner 7 and the top of the liner 3. Solidified type metal between the liner 4 and the liner 7 will remain in the mold while the temporary liner is being used in a particular position. The ejector blade of the type casting machine will be adjusted to eject a casting of the length provided by the temporary liner 7 in a particular position, and will not eject the liner 7 or the solidified metal in the remaining portion of the mold cavity. Thus, if the liner 7 is set to produce a line of fifteen ems the ejector blade will be set accordingly. When, however, it is desired to change the length of the mold cavity the ejector blade of the machine will be set for the maximum length, say thirty ems, and will eject the temporary liner 7 and the cast slug between the liner 4 and the liner 7, so that the whole of the cavity 5 will be free.

The device which is the subject matter of this invention is designed to accurately position and insert a liner 7 in the cavity 5 at any predetermined position.

The device includes as a support a longitudinal scale piece 9 and a bar 10, rigidly secured to each other by brackets 11 and 12. The bar 10 serves as a guide for a follower 13, to which is rigidly secured a locating finger 14. The finger has on its lower side a straight edge 15 to register with marks on the scale 9 and adapted to be inserted into the mold cavity for engagement with the top of the liner or end wall 3 of the mold cavity.

A clamping screw 16 is adapted to clamp the follower 13 to the bar 10 in any selected position. Thus, if it is intended to produce a line fifteen ems in length the follower 13 with the finger 14 is moved along the rod 10 and the scale 9 until the lower edge of the finger 14 is in registration with the mark indicated by the numeral "15" on the scale, and the screw 16 is turned to clamp the follower and the finger in this selected position.

Figure 3:
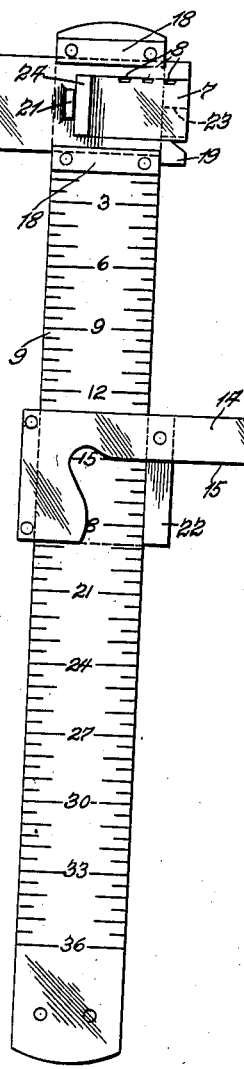
Fig. 3 is a plan view of the inserting device.
Figure 4:
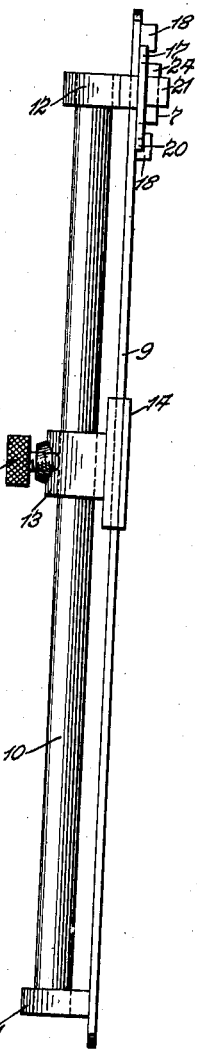
Fig. 4 is an edge view thereof.
Figure 5:
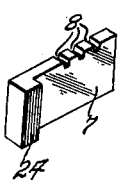
Fig. 5 is a view showing a detail.

A laterally reciprocating carrier 17 for the liner 7 is positioned at the upper end of the scale 9 and the bar 10 by guides 18. The reciprocating member or carrier 17 has a proper cutout or notch to receive the liner 7, as clearly shown in Fig. 3. The inner end of the slide or carrier 17 has a lug 19 to engage the end of a guide 18 while the upper end of the slide 17 has a lug 20 to engage the other end of the guide 18, thereby limiting the movement of the slide and keeping it from becoming displaced from the support. The carrier 17 has an outstanding lug 21 with its inner face flush with the bottom of the groove holding the liner 7, which lug engages the face of the mold and accurately positions the liner in the mold cavity depthwise, so that the top of the liner 7 is placed flush with the face of the mold.

The follower 13 has a straight edge 22 which engages the face of the mold and the bracket 12 has a forwardly extending straight edge 23 for engaging the face of the mold, as best shown in Fig. 2.

As particularly shown in the drawing, the liner 7 has an outwardly extending flange 24 to fit in the recess 6. It will be understood, of course, that in a standard mold such a flange will not be present and that in any event a cross section of the liner will correspond with the cross section of the mold cavity of whatever form it may be.

The thickness of the liner 7 should correspond closely to that of the mold cavity so that there will be a nice fit when it is inserted in the cavity between the base 1 and the cap 2 of the mold. This fit is such that when the cap 2 is properly tightened in place the liner will be clamped in position.

Figure 1:
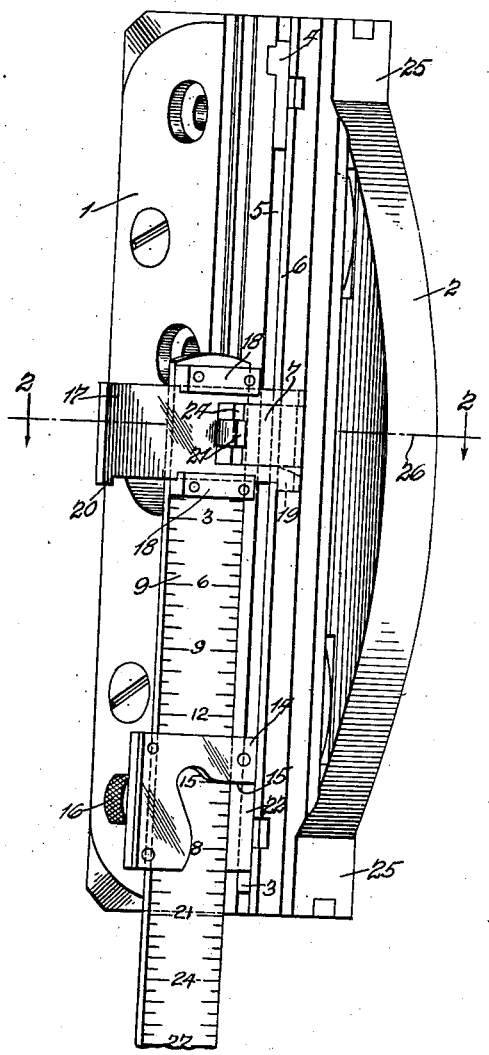
Fig. 1 is a quarter turned elevation showing a type casting mold and a device for inserting a temporary liner involving this invention.

A description of the method of using the device to insert the liner 7 in the mold cavity 5 is now given. Assuming that it is desired to form a mold cavity fifteen ems in length the finger 14 will be adjusted to the point as shown in the drawing, Figs. 1 and 3, and as explained above. The slide 17 will be moved outwardly to the position shown in Fig. 3 and a liner 7 will be inserted in the notch in the slide against the face of the scale piece 9. The device with the liner is placed in the position as shown in Fig. 1, with the bottom edge 15 of the finger 14 against the top of the liner 3 and with the edges 22 and 23 against the face of the mold. The outer edge of the slide 17 is pushed to slide the liner 7 into position, the slide 17 being stopped when the inner face of the lug 21 strikes the face of the mold. Thus the liner 7 will be accurately placed in position with its outer edge flush with the mold face.

As stated above, the liner 7 is accurately proportioned to nicely fit in the mold cavity. This will necessitate loosening the binding screws, not shown, which hold down the mold cap 2. There are three of these screws for each mold, two engaging the ends 25 of the mold cap respectively and the third engaging the top 26 of the mold cap. Ordinarily it will be necessary to loosen only the center screw, or the one engaging the top 26 of the mold cap. After the liner is inserted as described, the loosened screw or screws may be tightened before the device is taken out of the mold cavity. This is possible because the thickness of the slide 17 is less than that of the thinnest portion of the liner 7. An operator may soon become so skilled, however, to the use of the device that he will be able to loosen the cap screw or screws just sufficiently to make a tight fit and the liner 7 will, upon insertion, fit sufficiently close to stay in position and permit the removal of the positioning device before the cap screws are tightened.

As illustrated in the preferred embodiment, the guides 18 are fixed to the support while the locating finger 14 is movable therealong. While this is a preferred embodiment and advantageous, it may be understood that this condition may be reversed and that the finger 14 may be fixed while the guides 18 may be arranged on a follower.

It will be obvious that other changes may be made in the details of construction, within the scope of the appended claims, without departing from the spirit of this invention.

I claim:

1. A device for positioning a liner in a type casting mold including a longitudinal support, a locating finger on the support for insertion in the cavity of the mold and for engagement against an end wall thereof, a guide on the support, a laterally reciprocating carrier sliding in the guide having a recess to receive the liner and adapted to push the liner into the mold cavity, either the finger or the guide being movable longitudinally along the support with reference to the other whereby the liner may be inserted in the mold cavity a predetermined distance from said end wall, positioning means on the support for engaging the face of the mold, and a stop on the carrier even with the rear wall of the recess for engaging the face of the mold to limit the depth of the insertion of the carrier.

2. A device for positioning a liner in a type casting mold including a longitudinal graduated support, a locating finger slidably mounted for longitudinal movement on the support and adapted for insertion in the cavity of the mold, a guide fixed to one end of the support, a laterally reciprocating carrier sliding in the guide, having a recess to receive the liner and adapted to push the liner into the mold cavity, positioning means on the support for engaging the face of the mold, and a stop on the carrier even with the rear wall of the recess to limit the depth of the insertion of the carrier.

CHARLES A. KLISE